United States Patent [19]

Dvorsky

[11] Patent Number: 4,811,594
[45] Date of Patent: Mar. 14, 1989

[54] TOPOGRAPHY SENSOR

[75] Inventor: James E. Dvorsky, Columbus, Ohio

[73] Assignee: Battelle Memorial Institute, Columbus, Ohio

[21] Appl. No.: 185,385

[22] Filed: Apr. 25, 1988

[51] Int. Cl.[4] .............................................. G01B 7/34
[52] U.S. Cl. .................................. 73/105; 73/DIG. 4
[58] Field of Search ..................... 73/104, 105, DIG. 4

[56] References Cited

U.S. PATENT DOCUMENTS

| | | | |
|---|---|---|---|
| 3,792,204 | 2/1974 | Murayama et al. | 73/DIG. 4 X |
| 4,001,519 | 1/1977 | Rangabe | 369/170 X |
| 4,050,294 | 9/1977 | Andrews et al. | 33/542 X |
| 4,053,721 | 10/1977 | Nishikawa | 369/139 X |
| 4,106,333 | 8/1978 | Saljé et al. | 73/105 |
| 4,162,511 | 2/1979 | Toda et al. | 369/244 X |
| 4,433,386 | 2/1984 | Este | 73/105 X |
| 4,669,300 | 6/1987 | Hall et al. | 73/105 |

FOREIGN PATENT DOCUMENTS

| | | | |
|---|---|---|---|
| 684295 | 9/1979 | U.S.S.R. | 73/105 |
| 1111024 | 8/1984 | U.S.S.R. | 73/105 |

Primary Examiner—Tom Noland
Attorney, Agent, or Firm—Robert B. Watkins; Philip M. Dunson

[57] ABSTRACT

An apparatus and methods for use in measuring the topography of a surface by contact which comprises a piezoelectric polymer film sensor, such as polyvinylidiene difluoride film, with a body portion and a tip portion, with electrically conductive films adhered to each principal surface of the sensor, and a non-conductive support restraining the sensor a fixed distance from the surface to be measured and with the sensor having an arcuate form when flexed by the surface.

14 Claims, 1 Drawing Sheet

TOPOGRAPHY SENSOR

FIELD OF INVENTION

The present invention relates generally to measuring the topography of surfaces, and particularly concerns a new and improved sensor and method for characterizing soft smooth surfaces such as the surfaces of fibrous paper tissues or textile materials.

BACKGROUND OF THE INVENTION

In the promotion of many paper or textile products such as personal care products, the perceived texture and softness of the product by the consumer is important for its general acceptance and use. To obtain this desired texture and softness, a condition that is usually loosely defined and difficult to describe, manufacturers expend considerable time and effort adjusting their manufacturing process to produce materials with a fiber content, size, and dispersion that ultimately "feels soft" in the final product. Often, the determination of texture and softness is accomplished by a team of human evaluators who touch and manipulate product samples to evaluate the quality and acceptability of the material. While the judgment is mostly qualitative, this typical approach to quality assurance has generally worked well in the past.

Unfortunately, the use of human evaluators has a number of limitations. The decision of whether or not a material has an acceptable texture and softness is largely qualitative, and the number of process variables involved in achieving this softness is large. Often it is difficult, without considerable analysis, to precisely locate operations within the manufacturing process that may require adjustment. Furthermore, because human beings are subject to sickness, emotional stress, and dermatological ailments, among others, the judgment of texture or softness made by the evaluation team is not always accurate and repeatable. This fluctuation in judgment can be detrimental to the manufacturer in two ways:

(1) If good material is judged as unacceptable, considerable time and resources are needlessly wasted in trying to correct the situation.

(2) More importantly, if poor material is judged as acceptable, the product may eventually be rejected by the consumer, adversely affecting the manufacturer's reputation.

In response to the need for more reliable quality assurance testing, texture sensors have been incorporated into the evaluation process. While not intended to replace the human evaluators, these devices are designed to assist in the human judgment and provide a more consistent and quantitative approach to quality control. The most typical approach used in conventional texture sensors consists of a stylus (similar to that used in a phonograph), a displacement transducer, and signal processing circuitry. Such a configuration yields an indication of fiber size, dispersion, and composition as the tip of the sensor is pulled across the surface of the material. Like the phonograph needle on a record, the texture sensing stylus is deflected by the topography of the material, and the output signal is processed to determine the perceived surface softness of the material.

While the concepts of a texture sensing stylus works well in principle, its actual implementation has a number of shortcomings when actually applied to textiles and paper products. The test can be difficult to set up and execute because of irregularities in the product being tested. The rigid stylus can get snagged on fibers protruding above the surface and tear the material, negating any useful results. In other instances, only a qualitative assessment of the material's softness can be made.

The primary problem associated with using a rigid stylus on tissue-type materials is that the stylus is not well-suited for such an application. Rigid styluses have routinely been used to measure surface roughness of machined metals with great success. The sharpness and stiffness characteristics of the stylus give it its sensitivity and accuracy to measure machined surface roughness to a resolution on the order of microinches. Unfortunately, these same qualities are its downfall when applied to textile and paper products. Fibers extending from the surface can catch on the sharp stylus as it progresses across the surface of the material being measured. Other flexible fibers comprising the material can be torn or moved out of the path of the stylus, resulting in a trough through the material surface that traces the stylus' path, as well as resulting in a poor measurement of surface features.

Attempts to modify the stylus approach for use on personal care products have produced limited results at best. In order to prevent the device from destroying the surface of the material, sensitivity to surface topography measurement is often sacrificed.

Because the results are not always reliable, the stylus sensor has not gained widespread acceptance in texture sensing, and, despite its limitations, the use of human evaluators is often considered more cost effective. Therefore, the need for an accurate, reliable, and cost-effective approach to surface texture sensing still exists.

Alternatives to the rigid stylus/vibration sensor arrangement for quickly and accurately determining the surface quality of personal care products have been generally unavailable. However, advances in sensing technologies and signal processing offer a solution to this problem.

SUMMARY OF THE INVENTION

A film-type piezoelectric polymer sensor, which functions both as a stylus and a transducer, may be advantageously utilized to make surface measurements and topographic characterizations of materials such as soft fibrous paper and textile sheet materials. Opposed principal surfaces of the sensor's piezoelectric polymer film are coated with metallic layers which serve to conduct the sensor's electrical output signals to cooperating amplifier, signal processing circuitry, and data acquisition system apparatus. When sensing the surface of a fibrous product such as a paper tissue, the sensor body is initially fixedly held in position and with an included arcuate form in the sensor tip portion that applies some inherent spring force against the specimen surface to maintain continued contact. Afterwards subject specimens are drawn past the arcuate sensor film tip at a slow constant rate.

Alternatively, the specimen may be held fixed while the sensor is drawn across the specimen surface. In either case the sensor tip portion is mechanically deflected by surface characteristics of fibrous structure in the tested material. Due to the piezoelectric nature of the sensor the deflections generate a corresponding electrical signal at incorporated metallic electrodes.

The foregoing and other advantages of the invention will become apparent from the following disclosure in which a preferred embodiment of the invention is described in detail and illustrated in the accompanying drawings. It is contemplated that variations in structural features and arrangement of parts may appear to the person skilled in the art, without departing from the scope or sacrificing any of the advantages of the invention.

DETAILED DESCRIPTION OF THE INVENTION AND PREFERRED BEST MODE EMBODIMENT

Figure 1:
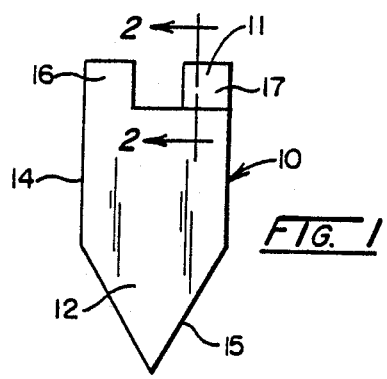
FIG. 1 is an elevational view of a preferred embodiment of the sensor of this invention.

A preferred embodiment of the topography sensor of this invention is designated generally as 10 in the drawings. Such sensor is comprised of a piezoelectric polymer film 11 provided with adhering electrically conductive coatings 12 and 13. Film 11, in one actual embodiment of this invention, was constituted of polyvinylidene difloride (PVDF) of approximately 28 micrometers thickness. Such material is believed useful for paper tissue topographic sensors over a range of thicknesses extending from about 5 micrometers to about 100 micrometers. Coatings 12 and 13 in the actual embodiment were a highly electrically conductive silver paint applied to film 11 in a conventional manner. It is probable that other conductive coatings in the form of painted or electro-deposited metal, such as nickel-aluminum, would also be satisfactory.

Figure 2:
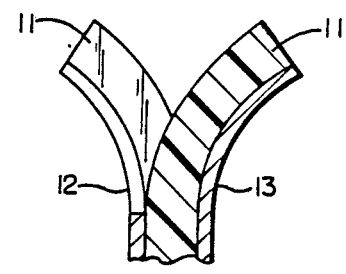
FIG. 2 is an elevational sectional view taken along line 2—2 of FIG. 1.

As best illustrated in FIGS. 1 and 2, sensor 10 is configured with a body portion 14, a point or tip portion 15, and integral tab portions 16 and 17. These integral tabs are extensions of the metallic coatings on the principal surfaces of the sensor and readily permit electrical connections using conventional "duck bill" or "alligator" clamps that are connected to a shielded cable 17a. A more permanent means of electrical connection, such as direct bonding with conductive epoxy, may be used to connect cable 17a to the sensor.

Figure 3:
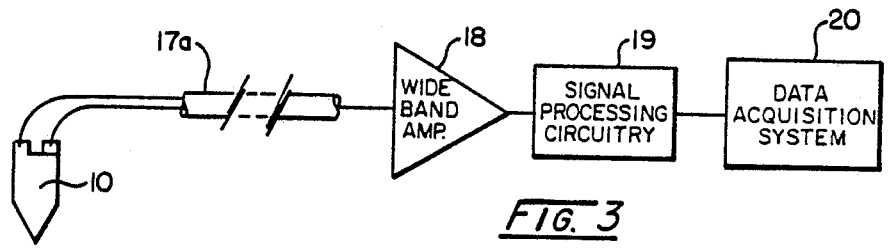
FIG. 3 is a schematic view of a sensor system utilizing the sensor invention of this application.

FIG. 3 schematically illustrates a total sensor system utilizing sensor 10. Such total system includes a wide band amplifier 18 having a bandwidth greater than 100 kHz. The output of amplifier 18 is fed to signal processing circuitry 19 to help reduce the electromagnetic interference associated with the conductors of sensor 10 and to integrate the output signal over the sampling period. Finally, the output signal of signal processing circuitry 19 is fed to the input channel of a state-of-the-art data acquisition system 20 for storage and display. In the system, low level analog signals generated by the piezoelectric sensor 10 are amplified, filtered, digitized, stored on magnetic disks for subsequent utilization by plotting of data points, and displayed on a video screen for viewing.

Figure 4:
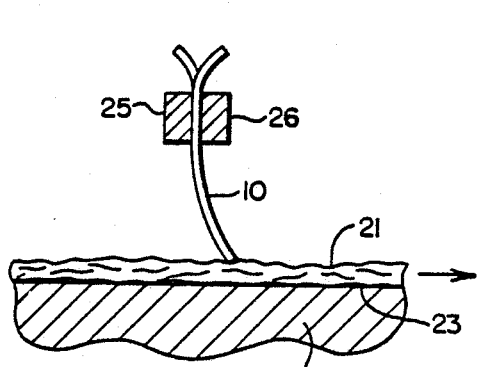
FIGS. 4 and 5 are side and front elevational views, respectively, of the sensor of this invention being utilized to measure the surface topography of a fibrous paper tissue.
Figure 5:
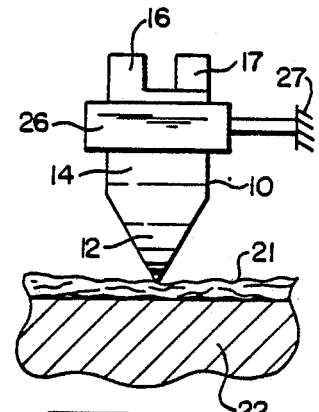

FIGS. 4 and 5 schematically illustrate the application of sensor 10 to an installation used for the measurement of the surface of a sample paper tissue 21. Sample 21 is supported on a flat base 22. The body portion 14 of sensor 10 is mounted and secured in place by flat rigid cooperating clamp components 25 and 26. These components must be electrically insulated from each other to avoid shorting the piezoelectric sensor output. They may, in one embodiment, be used to conduct the electrical signals from the sensor in lieu of tabs 16 and 17 or other connecting means. In the preferred embodiment, clamp components 25 and 26 are maintained in a fixed position relative to support 27 and base surface 23.

When mounted in place, the distance from the upper surface of sample 21 to clamping elements 25 and 26 is slightly less than the free length of the tip of sensor 10 so as to thereby impart an arcuate form to the sensor tip portion as best shown in FIG. 4. In one instance the tip of sensor 10 measuring approximately ½ inch wide with approximately a 22.5 degree taper from either edge (45 degree angle at tip) was mounted so that the tip portion of the sensor extended 15/32 inches from the bottom of the clamping components 25 and 26 when the sensor was in an unflexed condition. When the sensor was mounted in relation to flat base 22, the distance from the bottom of clamping elements 25, 26 to the top of base 22 was 29/64 inches. This produced a slight arcuate form in the piezoelectric polymer sensor. During testing that base was held stationary while the sample tissue was moved across the base surface 23 and past the tip of sensor 10 at a controlled speed of approximately 5 inches per minute using a geared down induction motor. An alternative approach is to fix the specimen sample to the base and translate both as a single unit past the senor tip. Sensor 10, particularly the tip portion 12, functions in the illustrated application both as a stylus and as a transducer.

Figure 6:
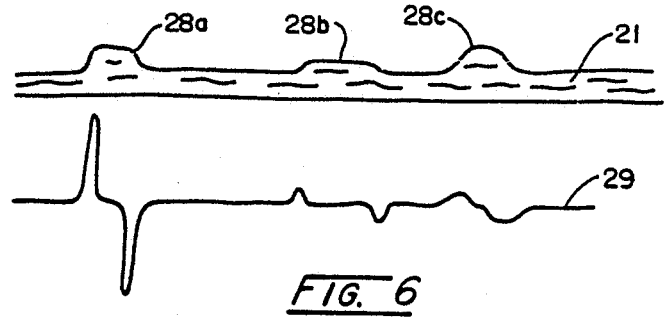
FIG. 6 illustrates the relationship between surface topographic features and the piezoelectric sensor output signal.

By its nature and internal composition, the piezoelectric element is a transient-oriented device. That is, rapid changes will produce large output signals, while steady-state deflection will produce little output signals. In FIG. 6, output signal 29 is shown to vary according to the size and rate of change of surface topographic features 28. As a texture or topography sensor, the sensor encounters different fiber structure variations relating to size, clumping, distribution, etc. As it encounters a prominent fiber structure, the element will tend to follow its surface contour, flexing and storing energy as it does so and generating an output signal. Eventually, as the fiber structure moves away from the sensor the sensor relaxes back into its original position, and a corresponding signal is produced.

Thus, it appears that the signal output more closely represents the derivative of the topography rather than the actual topography. This is evident from the signal traces. An examination of plotted data discloses that the output for coarse tissue has prominent peaks and several negative spikes. Medium and soft textured tissue produce similar outputs but the amplitudes of the spikes are smaller, and the peaks are slightly less prominent. Finally, smooth cardboard, which has few topographic features, produces considerable consistency in the sensor output with few prominent peaks or negative spikes.

Coarse tissues tend to have larger fiber structures, spaced more widely apart than soft or medium tissues. As the sensor traverses and deflects over the large clumps and is subsequently released, large peaks and spikes are generated in its output. Smoother surfaces are more refined, having smaller features that are more closely packed. As the sensor moves over these surfaces, the amount of energy stored and released in the flexing element is less, so the output signal tends to have less amplitude.

Although the drawings illustrate tip portion 12 of sensor 10 as having a sharp point, it is sometimes preferred that the point have either a rounded configuration of small radius or even a flattened configuration. Depending on the fiber characteristics of the test specimen, the sensor may have different sensitivities in response to the different point configurations.

One variation of stylus 10 involves a duplication or "doubling" of films 11, 12, and 13 in the final assembly to provide a shielding and enhancement of the stylus output signal. In the alternate shielded construction, one of film 12 or 13 is doubled upon itself and bonded with a conductive adhesive such as a conductive epoxy. The doubled conductive film provides the active output signal and the outer most conductive film is connected to the output grounded shield.

It is herein understood that although the present invention has been specifically disclosed with the preferred embodiments and examples, modifications and variations of the concepts herein disclosed may be resorted to by those skilled in the art. Such modifications and variations, for example flattening the sensor tip or altering the sensing element geometry, are considered to be within the scope of the invention and the appended claims.

I claim:

1. Apparatus, for use in measuring the topography of a surface by contact, comprising:
    (a) a piezoelectric polymer film having opposite principal surfaces and configured to have a body portion and a joined tip portion;
    (b) a separate electrically conductive film adhered to each principal surface of said piezoelectric polymer film;
    (c) electrically non-conductive support means rigidly restraining said piezoelectric film within said body portion a fixed distance from the surface to be measured; and
    (d) means for conducting electrical output signals from said electrically conductive films to output signal receiving apparatus,
said piezoelectric polymer film and adhered electrically conductive films being resilient relative to said support means and having an arcuate form when flexed by contact with the surface to be measured.

2. The invention defined by claim 1 wherein said piezoelectric polymer film is polyvinyldiene difluoride.

3. The invention defined by claim 2 wherein said piezoelectric film has a thickness in the range from about 5 micrometers to about 100 micrometers.

4. A stylus, for use in measuring the topography of a surface by contact, comprising:
    (a) a piezoelectric polymer film having opposite principal surfaces and configured to have a body portion with a joined tip portion for contacting the surface to be measured and with joined tab portions for electrical connection to output receiving apparatus; and
    (b) a separate electrically conductive film adhered to each principal surface of said piezoelectric polymer film,
said electrically conductive films conducting an electrical output signal generated by said piezoelectric polymer film whenever said joined tip portion is moved to have a changed arcuate form as a result of contact with the surface to be measured.

5. The invention defined by claim 4 wherein said piezoelectric polymer film is polyvinyldiene difluoride.

6. The invention defined by claim 5 wherein said piezoelectric polymer film has a thickness in the approximate range of from 5 micrometers to 100 micrometers.

7. The invention defined by claim 4 wherein said separate electrically conductive films are adhered silver paint.

8. The stylus defined by claim 4 and further comprising a second piezoelectric polymer film conforming to said first piezoelectric polymer film, said second piezoelectric polymer film having a electrically conductive film adhered to at least one of its principal surfaces to provide shielding and enhancement of the stylus output signal.

9. In a method of measuring the topography of a fibrous surface, the steps of:
    (a) contacting the fibrous surface with a piezoelectric polymer film stylus; and
    (b) causing the fibrous surface and the stylus to move relative to each other and the stylus to flex and generate an output electrical signal which is proportional to the stylus rate of flexure.

10. Apparatus, for use in measuring the topography of a surface by contact, comprising:
    a. a piezoelectric stylus having a tip portion that contacts the surface to be measured; and
    b. signal conductor means connected to said stylus, said stylus generating an electrical output signal that is inputted to said conductor means when said stylus tip portion is moved in contacting relation to the surface to be measured.

11. The apparatus defined by claim 10 wherein said piezoelectric stylus is a piezoelectric polymer film.

12. The apparatus defined by claim 11 wherein said piezoelectric polymer film is polyvinyldiene di-fluoride.

13. The apparatus defined by claim 10 wherein said signal conductor means is adhered silver paint.

14. The apparatus defined by claim 10 wherein said signal conductor means is electroplated silver.

* * * * *